(12) United States Patent
Yi et al.

(10) Patent No.: US 7,611,750 B2
(45) Date of Patent: Nov. 3, 2009

(54) NANOCOMPOSITE MATERIAL AND METHOD OF MANUFACTURING THE SAME COMPRISING FORMING AN INORGANIC MATRIX BY SOL-GEL REACTION

(75) Inventors: Dong-kee Yi, Seoul (KR); Byung-ki Kim, Gyeonggi-do (KR); Jae-ho Lee, Gyeonggi-do (KR); Eun-joo Jang, Daejeon-si (KR); Seong-jae Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 248 days.

(21) Appl. No.: 11/566,253

(22) Filed: Dec. 4, 2006

(65) Prior Publication Data
US 2007/0199109 A1 Aug. 23, 2007

(30) Foreign Application Priority Data
Feb. 21, 2006 (KR) .................. 10-2006-0016675

(51) Int. Cl.
*B05D 1/38* (2006.01)
*B05D 3/10* (2006.01)
*B32B 5/16* (2006.01)
(52) U.S. Cl. .................. 427/218; 117/73; 117/75; 427/219; 427/397.7; 427/397.8; 427/419.2; 428/403; 428/404; 977/778; 977/779

(58) Field of Classification Search ............ 428/403, 428/404, 405; 427/215, 219, 397.7, 397.8, 427/419.2; 117/73, 75; 977/778, 779
See application file for complete search history.

(56) References Cited

U.S. PATENT DOCUMENTS

| 5,751,018 | A * | 5/1998 | Alivisatos et al. ............. 257/64 |
| 6,322,901 | B1 * | 11/2001 | Bawendi et al. ............. 428/548 |
| 6,548,264 | B1 * | 4/2003 | Tan et al. .................. 435/7.21 |
| 6,620,514 | B1 * | 9/2003 | Arpac et al. ................. 428/447 |
| 6,699,723 | B1 * | 3/2004 | Weiss et al. ................. 436/518 |
| 6,916,514 | B2 * | 7/2005 | Bringley et al. .......... 428/32.35 |
| 6,969,422 | B2 * | 11/2005 | Mazany et al. .............. 106/600 |
| 7,190,870 | B2 * | 3/2007 | Sundar et al. ............... 385/129 |

FOREIGN PATENT DOCUMENTS

JP 10280138 10/1998

* cited by examiner

*Primary Examiner*—H. (Holly) T Le
(74) *Attorney, Agent, or Firm*—Cantor Colburn LLP

(57) ABSTRACT

A nanocomposite material and a method of manufacturing the same are disclosed. The nanocomposite material includes a plurality of nanoparticles coated with a metal oxide, and a matrix of the metal oxide immobilizing the nanoparticles that are dispersed therein. The nanocomposite material is manufactured such that macro- or macro-scale cracks are prevented or effectively prevented, light stability is enhanced over a light-emitting period, and light brightness is improved.

17 Claims, 7 Drawing Sheets

NANOCOMPOSITE MATERIAL AND METHOD OF MANUFACTURING THE SAME COMPRISING FORMING AN INORGANIC MATRIX BY SOL-GEL REACTION

This application claims priority to Korean Patent Application No. 10-2006-0016675, filed on Feb. 21, 2006 in the Korean Intellectual Property Office, and all the benefits accruing therefrom under 35 U.S.C. §119, the contents of which are incorporated herein by reference in its entirety.

BACKGROUND OF THE INVENTION

1. Field of the Invention

The present invention relates to a nanocomposite material and a method of manufacturing the same. More particularly the present invention relates to a nanocomposite material whose internal defects are reduced or eliminated and light stability is enhanced, and a method of manufacturing the same.

2. Description of the Related Art

An example of a nanocomposite is a composite material in which nanoparticles such as quantum dots are densely arranged within a light-transparent matrix material consisting of a metal oxide or a polymer material.

Ligand-exchange processes have been used to manufacture such a nanocomposite material. In particular, a surface ligand of an organic molecule that is chemically coordinated on the surface of the quantum dots obtained by a wet chemical process is exchanged with a hydrophilic ligand having high affinity for a polar solvent such as water or an alcohol. For example, an organic compound such as 4-methylaminopyridine (DMAP) or another polymeric compound is added and the surface ligand of an organic molecule is exchanged with a hydrophilic ligand. Then the quantum dots, whose surfaces are modified, are mixed in a precursor solution, and the mixture is subjected to a sol-gel reaction and then a drying process, thereby obtaining a nanocomposite material impregnated with the quantum dots as a hardened solid.

FIGS. 1A and 1B are photographs of an existing nanocomposite material during the drying process, in which cracks grow when the nanocomposite material is being dried due to a non-symmetrical drying rate between the surface and the inner body of the nanocomposite, which eventually cracks into pieces. The binding strength and affinity between a matrix material and quantum dots impregnated therein is so insufficient that cracks occur frequently in the nanocomposite material as the solvent in the sol phase is evaporated during the drying process. Such cracks formed in the nanocomposite material, for example, reduce the efficiency for extracting light, provide a penetrating path for harmful materials such as oxygen/moisture thereby reducing the emitting property of the nanoparticles, and decrease the durability of the nanocomposite material.

To address these problems, the drying process can be somewhat delayed by adding a drying releasing agent such as dimethylformamide (DMF) to a precursor solution of the matrix. However, for such a method, impurities are inevitably incorporated into the nanocomposite material, and disruptive behavior can be induced in the nanocomposite material as the extra releasing agent is evaporated.

BRIEF SUMMARY OF THE INVENTION

The present invention includes providing a nanocomposite material whose internal defects such as cracks are reduced or eliminated and whose light-emitting stability is enhanced, as well as a method of manufacturing the same.

According to an exemplary embodiment of the present invention, a nanocomposite material includes a plurality of nanoparticles coated with a metal oxide, and a matrix of the metal oxide immobilizing the nanoparticles that are dispersed therein.

The matrix may be formed from a network structure of the metal oxide.

The metal oxide may be $SiO_2$ or $TiO_2$.

The nanoparticles may include Group II-VI semiconductor compounds selected from the group consisting of CdSe, CdTe, CdS, ZnSe, ZnTe, ZnS, lnP, GaP, and GaInP$_2$.

The nanoparticles may include metal particles selected from the group consisting of Au, Ag, Fe, and Co, or an oxide particle of the selected metal.

According to another exemplary embodiment of the present invention, a method of manufacturing a nanocomposite material includes coating the surface of synthesized nanoparticles with a metal oxide to modify the surface, conducting a sol-gel reaction in a precursor solution in which the surface-modified nanoparticles are mixed with a precursor material of the metal oxide; and drying and gelling the precursor solution to form a solid matrix.

The method may also include synthesizing the nanoparticles.

The nanoparticles can be synthesized through a wet-chemical process, that includes injecting at least one precursor material into an organic solvent capable of being coordinated, and growing crystals into nanoparticles having a uniform size.

Modifying the surface includes mixing the nanoparticles, an alkali catalyst for synthesizing a metal oxide, and a precursor material of the metal oxide in an organic solvent in which a surfactant is dispersed, and conducting a condensation reaction to synthesize the metal oxide on the surface of the nanoparticles. The surfactant may be a non-ionic surfactant that has an ether group as a hydrophilic group and an alkyl group as a hydrophobic group.

The sol-gel reaction is conducted in a precursor solution in which coated nanoparticles, a precursor material, and an alkali catalyst mediating a covalent bond between the nanoparticles and the precursor material are mixed in predetermined ratios in an aqueous polar solvent.

Drying includes exposing the precursor solution to an inert gas atmosphere or heating the precursor solution at a constant temperature.

BRIEF DESCRIPTION OF THE DRAWINGS

The above and other features and advantages of the present invention will be more clearly understood from the following detailed description taken in conjunction with the accompanying drawings, in which.

DETAILED DESCRIPTION OF THE INVENTION

Figure 1A:
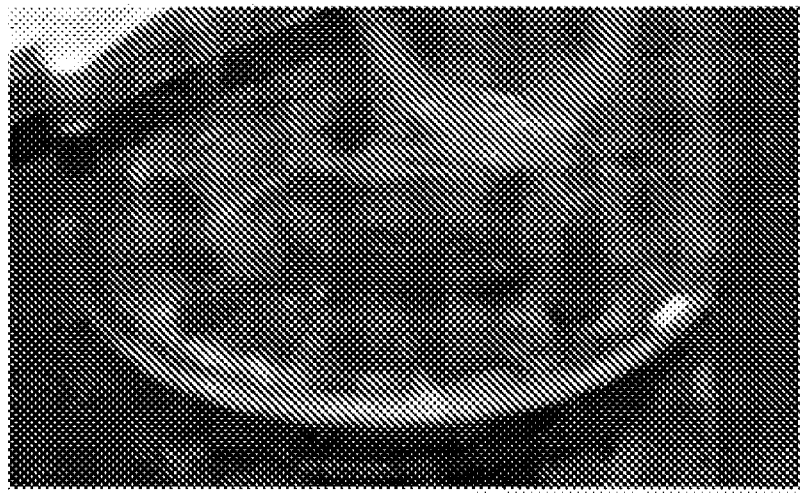
FIGS. 1A and 1B are photographs showing a disruptive phenomenon of an existing nanocomposite material due to a crack caused during drying.
Figure 1B:
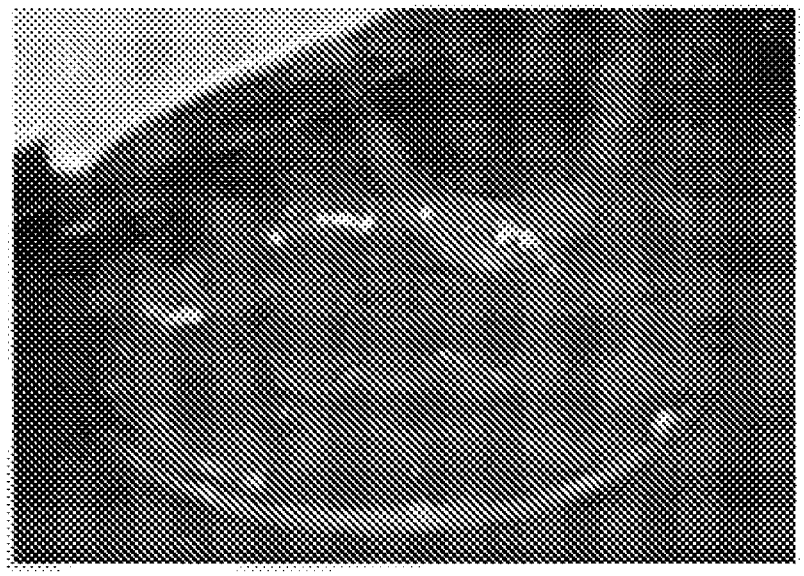

The present invention will now be described more fully hereinafter with reference to the accompanying drawings, in which exemplary embodiments of the present invention are shown. This invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, and the like may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Throughout the specification, the nanoparticles refer to nanoparticles which have specific chemical, optical, electrical, and/or magnetic properties, depending on their size. The nanoparticles can include quantum scale nanoparticles, i.e., those having an average size of less than or equal to about 10 nanometers (nm), or an oxide particle of one or more of the foregoing metals (e.g., $Fe_2O_3$). The nanoparticles can include quantum dots comprising one or more Group II-VI semiconductor compounds. In an exemplary embodiment, the quantum dots comprise one or more semiconductor compound selected from the group consisting of CdSe, CdTe, CdS, ZnSe, ZnTe, ZnS, InP, GaP, and $GaInP_2$. The nanoparticles can have a homogeneous single structure or a core-shell double structure. Each core and shell in the core-shell double structure may comprise a different semiconductor compound, metal, and/or metal oxide. In an exemplary embodiment, the core and shell in the core-shell structure comprises one or more selected from the group consisting of CdSe, CdTe, CdS, ZnSe, ZnTe, ZnS, InP, GaP, Au, Ag, Fe, Co, $Fe_2O_3$, FePt, and $GaInP_2$. The energy band gap of the shell material may be greater than that of the core material. The quantum dots emit energy according to an inherent energy band gap when receiving light from a light source, and reach an excited state. Therefore, the energy band gap can be controlled by controlling the size of the quantum dots, and thus light having various wavelengths spanning the visible light spectrum as well as ultraviolet light can be observed.

Figure 2:
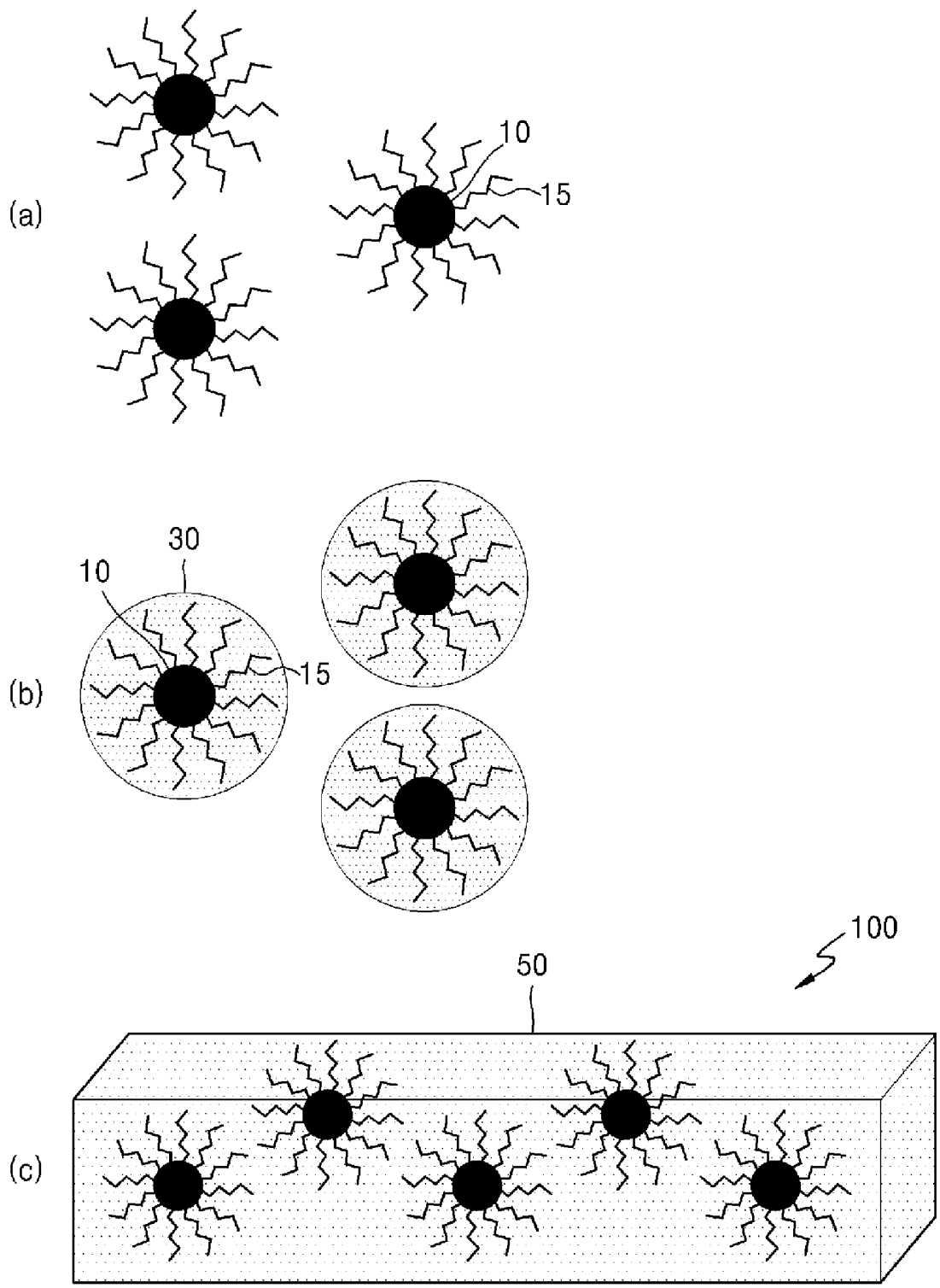
FIGS. 2A through 2C are schematic illustrations of an exemplary embodiment of a method of manufacturing a nanocomposite material according to the present invention.

FIGS. 2A through 2C are schematic illustrations of an exemplary embodiment of a method of manufacturing a nanocomposite material according to the present invention. Referring to FIGS. 2A through 2C, the method of manufacturing a nanocomposite material comprises synthesizing nanoparticles 10 (FIG. 2A), modifying the surface of the nanoparticles 10 by forming a matrix coating layer 30 on the surface of the nanoparticles 10 (FIG. 2B), conducting a sol-gel reaction in a precursor solution in which the surface-modified nanoparticles 10 are mixed with a precursor material of the matrix, and drying the precursor solution to form a solid matrix 50 in which the nanoparticles 10 are impregnated in the solid state (FIG. 2C).

The quantum dots, as an example of the nanoparticles 10, can be synthesized using a wet chemical process. In an exemplary wet chemical process, a precursor material is incorporated into an organic solvent, which acts as a dispersant, and the growth of the nanoparticles is controlled by coordinating the organic solvent on the surface of nanoparticle crystals. For example, in order to obtain quantum dots of CdSe, a precursor material such as dimethyl cadmium ($(CH_3)_2Cd$) or trioctylphosphine selenide (TOPSe) is incorporated into an organic solvent that used trioctylphosphine oxide (TOPO) as a surfactant, thereby forming crystal, and the crystals are maintained for a specific time at a high temperature so that the crystals can grow to have a uniform size. In one embodiment, nanoparticles of CdSe/ZnS, which are surface capped with an organic molecule such as TOPO are produced.

Figure 3:
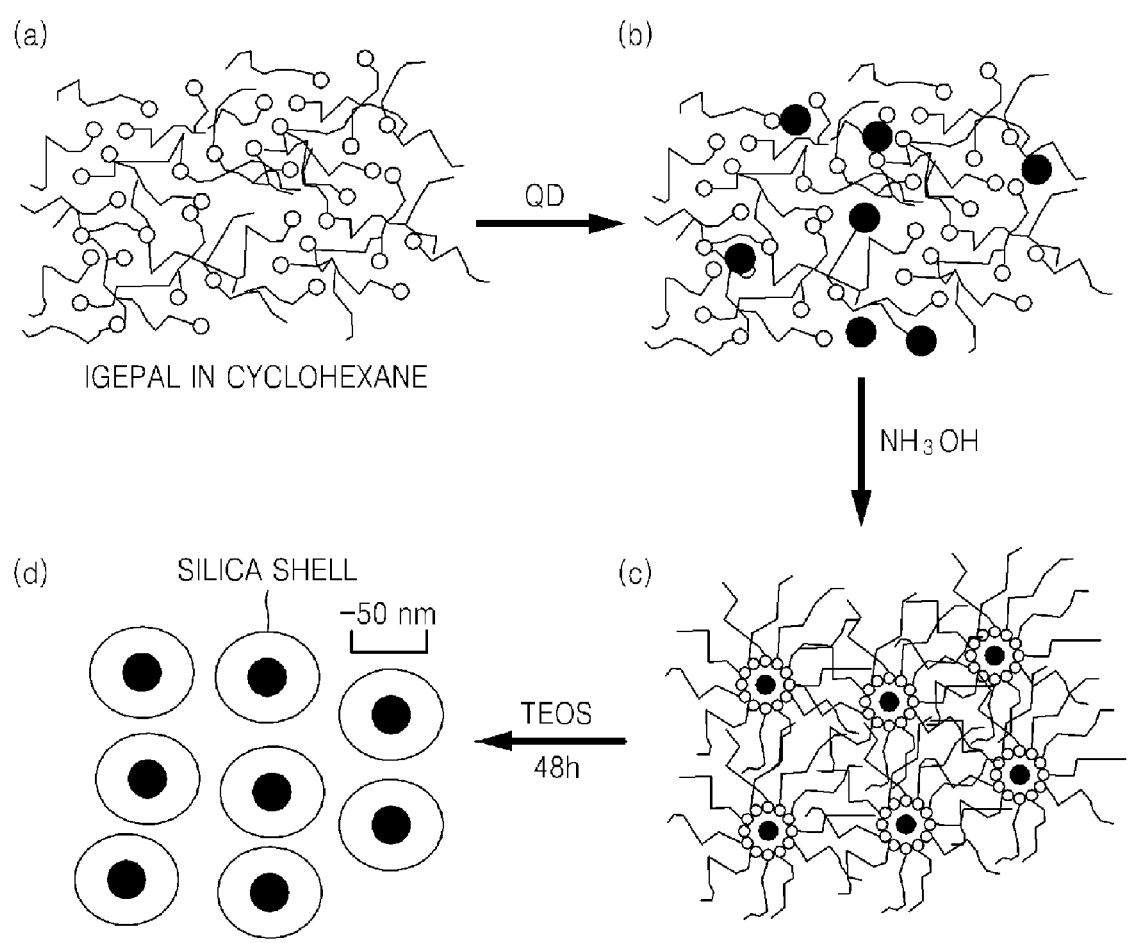
FIGS. 3A through 3D are schematic illustrations of an exemplary embodiment of a process of modifying a surface of a nanoparticle according to the present invention.

As can be seen in FIG. 2A, the surface of the nanoparticles 10 obtained using such a wet chemical process is coordinated with an organic ligand 15. The process of modifying the surfaces of the nanoparticles 10 as described below is conducted so that the nanoparticles 10 can be firmly incorporated into a network of a metal oxide matrix 50. As can be seen in FIG. 2B, in modifying the surface of the nanoparticles 10, the surfaces of the nanoparticles 10 are coated with the metal oxide that constitutes the matrix 50 (coating layer 30). By way of example, in an exemplary embodiment, when the matrix 50 is formed from a network of silica ($SiO_2$), the surface of the nanoparticles 10 is coated with silica. FIGS. 3A through 3D are schematic illustrations of an exemplary embodiment of a process of modifying a surface of the nanoparticles 10 according to the present invention. First, as can be seen in FIG. 3A, a surfactant is dispersed in an organic solvent. In an exemplary embodiment, the surfactant is a nonionic surfactant that has an ether group as a hydrophilic group, and has an alkyl group as a hydrophobic group. For example, about 50 mole percent (mol %) of polyoxyethylene (5)nonylphenyl ether (trade name: IGEPAL CO-520, which is hereinafter referred to IGEPAL) is dispersed in cyclohexane. A uniform dispersion may be achieved in the solvent using sonication. FIG. 3A schematically depicts the state of IGEPAL dispersed in the cyclohexane solvent. As seen in FIG. 3B, nanoparticles are subsequently mixed in the IGEPAL solution. For example, the solution in which CdSe quantum dots (1 milligram of quantum dots per milliliter or cyclohexane solvent) are dissolved is mixed in the IGEPAL solution. Next, as seen in FIG. 3C, an alkaline catalyst is added to the mixed solution of the IGEPAL and nanoparticles. For example, a 29.4 volume percent solution of aqueous ammonia ($NH_4OH$) is added to the mixed solution to form a transparent emulsion. The added aqueous ammonia solution is present in the form of droplets in the mixed solution. The droplets provide a reaction environment for synthesizing silica as nanoparticles 10 are incorporated into the droplets.

Next, as seen in FIG. 3D, tetraethylorthosilicate (TEOS), which is a silica precursor material, is added to the emulsion, and the mixture is allowed to react for about 48 hours. The added precursor molecules are bound together while surrounding the nanoparticles 10, thereby growing to form a silica-coating layer. More particularly, the aqueous ammonia solution present in droplets acts as a catalyst to direct hydroxy groups (—OH) to the precursor molecules. The precursor molecules are bound together through a condensation reaction in which the hydroxy ions are dehydrated, thereby forming a silica coating layer in a gel state. The diameter of the nanoparticles 10 capped by the silica is about 20 to about 50 nm at the time that the reaction is complete.

Figure 4:
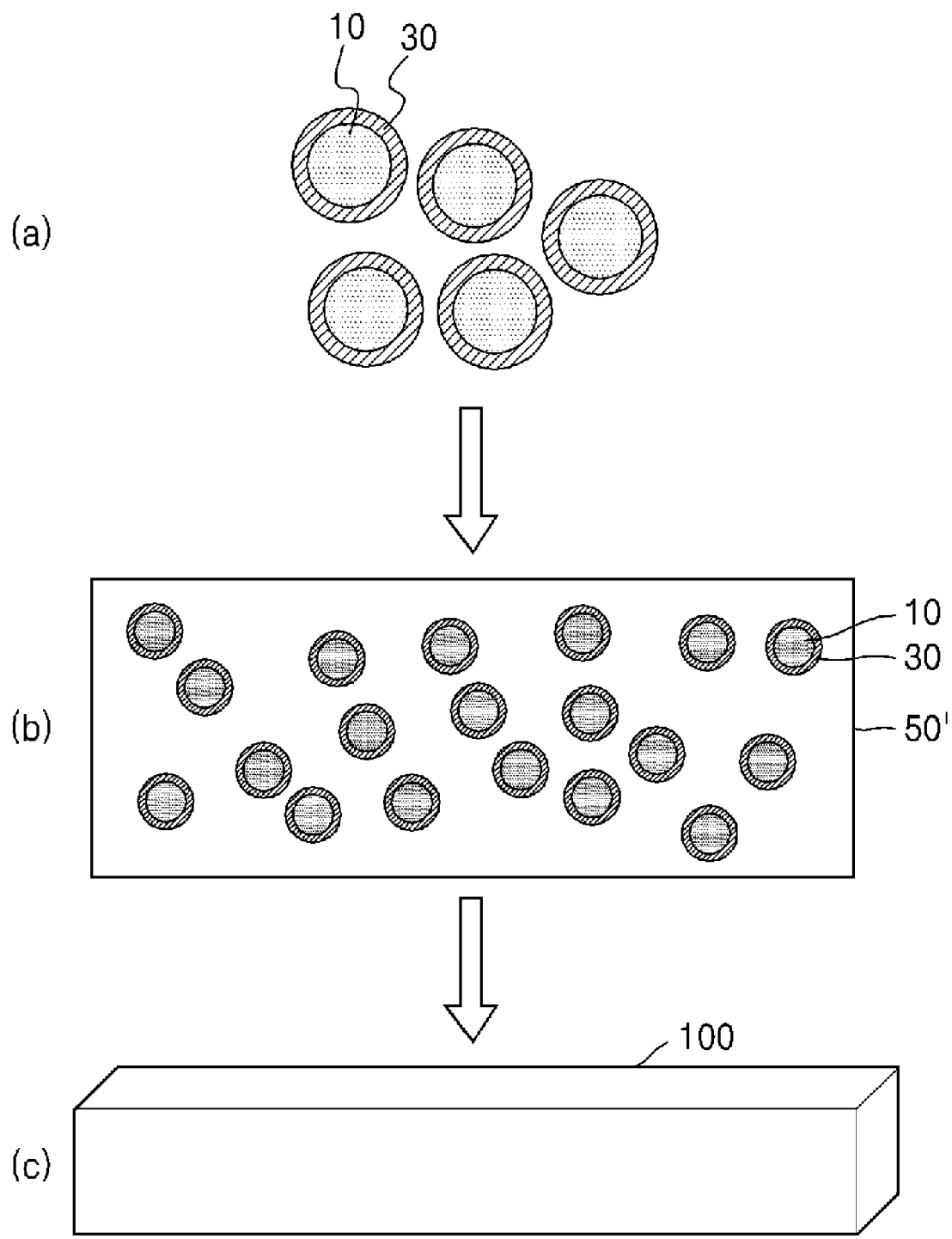
FIGS. 4A through 4C are schematic illustrations of an exemplary embodiment of a sol-gel reaction process and a drying process according to the present invention.

After coating the surface of the nanoparticles with silica as described above, a matrix of a gelled metal oxide is formed so that the nanoparticles 10 can be immobilized therein. First, as shown in FIG. 4A and FIG. 4B, the nanoparticles 10, which are encapsulated by the coating layer 30 are extracted from the solution through centrifugation or the like, and are dispersed in an alcoholic polar solvent 50' such as ethanol at a concentration of about 30 milligrams of encapsulated nanoparticles per ml of alcohol. Next, a silica precursor material, which can be tetramethoxysilane, is added to the ethanol solvent in which the nanoparticles 10 are dispersed. An aqueous ammonia solution ($NH_4OH$) is added thereto as an alkaline catalyst. The amount of the added ammonia solution can be increased or decreased within a proper range (e.g., about 5 microliters to about 20 microliters) according to the desired reaction rate. The aqueous ammonia solution acts as a catalyst to direct hydroxy groups (—OH) to the precursor molecules. The precursor molecules are bound together through a condensation reaction in which the hydroxy ions are dehydrated, thereby forming a network structure of silica. The nanoparticles 10 are immobilized in the silica matrix in a gel state through a sol-gel reaction accompanied by the condensation reaction. In other words, when the solution in which the nanoparticles 10 are dispersed is exposed to an inert gas atmosphere, a phase change occurs from a liquid state to a gel state while the ethanol solvent evaporates over time.

When the silica matrix in the gel state is exposed again to an ambient environment for a sufficient time, any remaining ethanol evaporates and is cured, thereby leaving a nanocomposite material 100 as seen in FIG. 4C. In order to promote the curing reaction during the drying process, the solution in which the nanoparticles 10 are dissolved may be heated at a specific temperature (e.g., less than or equal to about 100 degrees Celcius). However, the heating temperature should be limited so as to prevent internal cracks due to quick drying. Such a drying process may he also performed in a restricted humidity environment since, in an atmosphere having excessively high humidity, the evaporation of the alcoholic solvent is delayed, and thus it is not easy to obtain a matrix in a sufficiently dried state. In an advantageous feature of the process disclosed herein, macro- or micro-scale cracks in the drying process, which are caused due to lack of affinity between the nanoparticles and the matrix, are suppressed by introducing a surface modifying process that coats the nanoparticles with a metal oxide identical with the matrix material prior to the drying process.

Figure 5A:
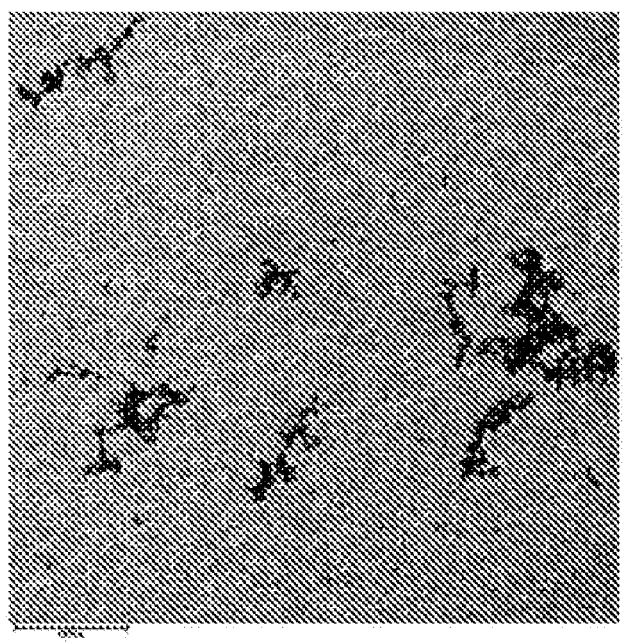
FIGS. 5A and 5B are transmission electron microscope (TEM) images at different magnifications of nanoparticles on which a silica coating was formed.
Figure 5B:
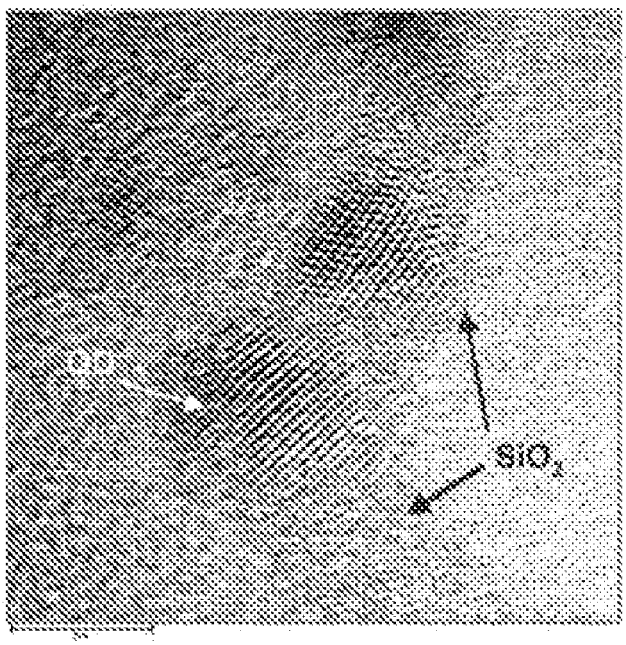
Figure 6A:
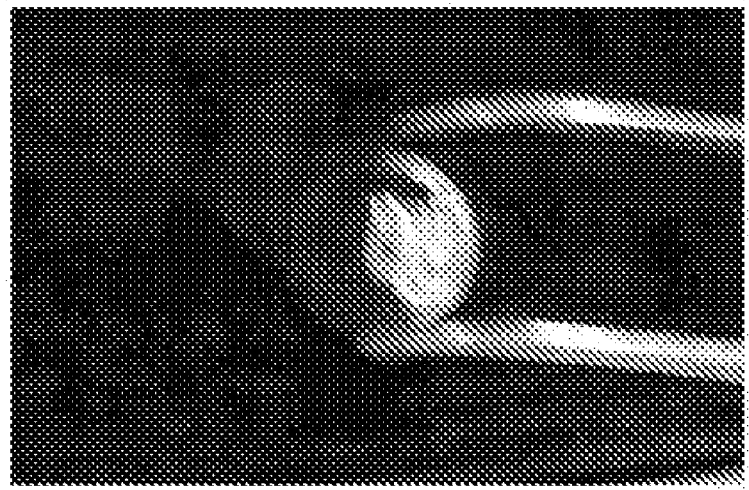
FIGS. 6A is a photograph of an exemplary embodiment of a nanocomposite material according to the present invention.
Figure 6B:

FIG. 5A is a transmission electron microscope (TEM) image of nanoparticles having a core/shell (CdSe/ZnS) structure coated with silica ($SiO_2$). FIG. 5B is a high-resolution TEM photograph of the nanoparticles of FIG. 5A. In FIG. 5B, portions that have a crystal lattice structure and are dark denote nanoparticles (labeled as "QD"), and portions that surround the nanoparticles (QD) and are lighter denote the silica coating layer (labeled as "$SiO_2$") surrounding the nanoparticles (QD). FIG. 6A is a photograph of an exemplary embodiment of a nanocomposite material according to the present invention, and FIG. 6B is a photograph illustrating a light-emitting state of the nanocomposite material of FIG. 6A when ultraviolet (UV) light of a specific wavelength was irradiated on the nanocomposite material.

Figure 7:
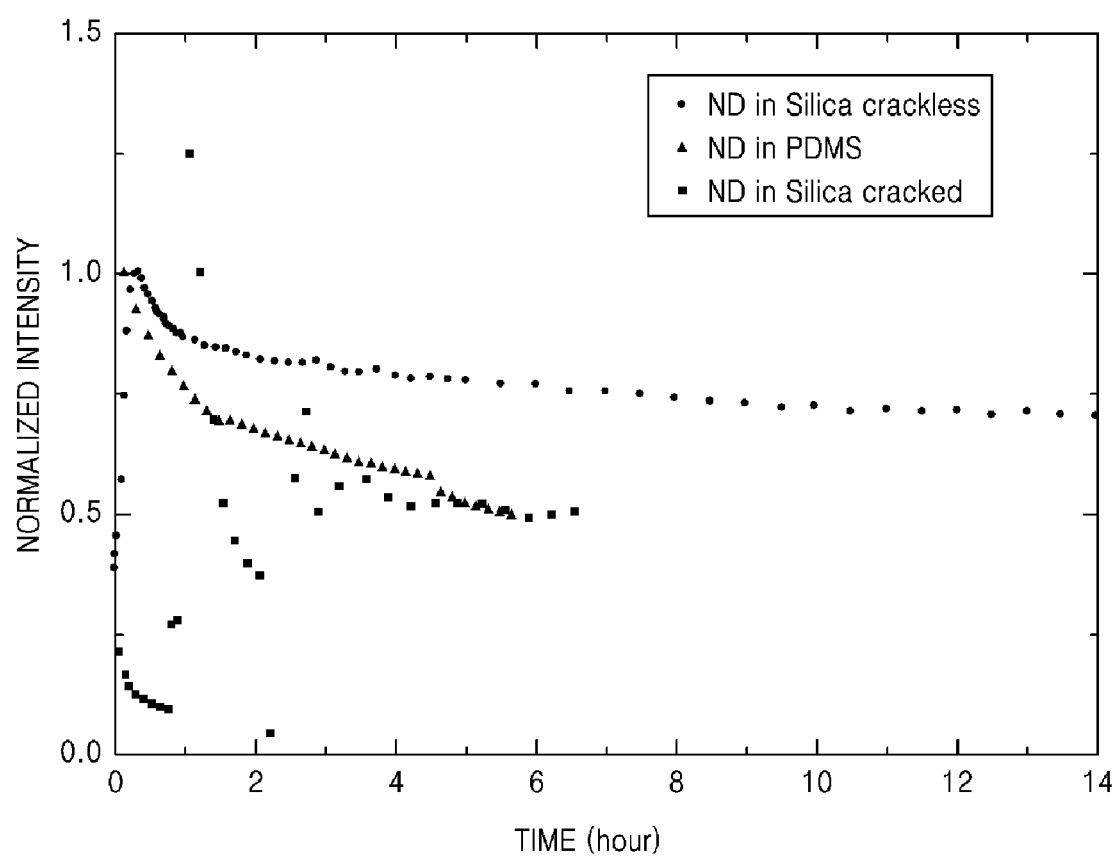
FIG. 7 is a graph comparing the light-emitting properties of an exemplary embodiment of a nanocomposite material according to the present invention with that of an existing nanocomposite material.

FIG. 7 is a graphical comparison of the light-emitting stability of an exemplary embodiment of a nanocomposite material according to the present invention and that of an existing nanocomposite material. FIG. 7 shows the normalized intensity of light over time when irradiating UV light at a wavelength of 398 nm. The normalized intensity of light denotes a value normalized based on the light intensity at initial light-emission. As can be seen in FIG. 7, an existing nanocomposite material ("ND in Silica cracked") shows that the normalized light intensity is unstable since the light intensity is different, with a wide range, over the light-emitting time. Such an emitting property probably results from the phenomenon that the state of light extraction is distorted by macro- or micro-sized cracks generated in the nanocomposite material.

Meanwhile, a nanocomposite material that adopted polydimethylsiloxane (PDMS) as a matrix (ND in PDMS) exhibits more stable light-emitting properties than the existing nanocomposite material in which cracks were formed, and shows a tendency that its normalized light intensity is continuously decreased over light-emitting time. For nanocomposite materials comprising a polymer matrix such as PDMS, urethane, and epoxy, the matrix that is originally amorphous and light-transparent is gradually crystallized thereby becoming opaque as the irradiation time from an excited light source increases. This results in a reduction of the normalized light intensity over time. For a nanocomposite material having a silica glass-based matrix made according to an exemplary embodiment of the present invention (ND in Silica crackless), although there is a tendency that the normalized light intensity decreases over light-emitting time, the extent of this tendency is lower than that of the polymer matrix sample (ND in PDMS). This nanocomposite material (ND in Silica crackless) also has more stable light-emitting properties, and exhibits a generally enhanced normalized light intensity.

The nanocomposite material of the present invention can be widely applied in various fields such as light devices, display devices, sensing devices, and the like. For example, it can be used as a light-emitting diode that generates visible light in a specific wavelength range, for example, as carriers are injected into the quantum dots through electrodes that are formed on the upper and lower surfaces of the nanocomposite material, and can be also used as an image forming means of a flat panel display with a backlight unit. Further, the nanocomposite material of the present invention can be applied as a sensing device that detects a toxic gas, for example, by taking advantage of the property that a range of wavelengths of projected light is changed based on the ambient environment.

Meanwhile, the matrix material employed in the nanocomposite material according to the present invention can include a metal oxide other than silica ($SiO_2$), such as titanium oxide ($TiO_2$). Precursor materials for titanium oxide are known; and a process of manufacturing the titanium oxide is substantially identical to that disclosed above.

In the present invention, in order to prevent cracks due to weakening of the binding force between a host matrix and nanoparticles incorporated therein in a dispersed state during the drying procedure for manufacturing the nanocomposite material, a surface modifying process in which the surface of the nanoparticles is coated with a component material of the matrix is incorporated prior to the drying procedure. Thus, by preventing macro- or micro-scale cracks of the nanocomposite material, the resulting stable light-emitting properties can maintain and enhance light intensity. In particular, the nanocomposite material according to the present invention can structurally prevent light intensity from decreasing due to crystallization by applying a metal oxide matrix.

Although the present invention has been described herein with reference to the foregoing exemplary embodiments, these exemplary embodiments do not serve to limit the scope of the present invention. Accordingly, it will be understood by those or ordinary skill in the art that various changes in form and details may be made therein without departing from the spirit and scope of the present invention as defined by the following claims.

What is claimed is:

1. A method of manufacturing a nanocomposite material comprising:
    coating surfaces of synthesized nanoparticles with a metal oxide to modify the surfaces of the nanoparticles;
    conducting a sol-gel reaction in a precursor solution in which the surface-modified nanoparticles are mixed with a precursor material of the metal oxide; and
    drying the precursor solution to form a solid matrix.

2. The method of claim 1, further comprising synthesizing a plurality of nanoparticles.

3. The method of claim 2, wherein synthesizing the plurality of nanoparticles comprises:
    injecting at least one precursor of the plurality of microparticles into an organic solvent capable of being coordinated; and
    growing crystals into the plurality of nanoparticles having a uniform size.

4. The method of claim 1, wherein the nanoparticles comprise quantum dots comprising a Group II-VI semiconductor compound selected from the group consisting of CdSe, CdTe, CdS, ZnSe, ZnTe, ZnS, InP, GaP, and $GaInP_2$.

5. The method of claim 1, wherein the nanoparticles comprise metal particles selected from the group consisting of Au, Ag, Fe, Co, and an oxide particle of the selected metal.

6. The method of claim 1, wherein the metal oxide is $SiO_2$ or $TiO_2$.

7. The method of claim 1, wherein modifying the surface of the nanoparticles comprises:
    mixing the nanoparticles, an alkali catalyst for synthesizing the metal oxide, and a precursor material of the metal oxide in an organic solvent in which a surfactant is dispersed; and
    conducting a condensation reaction to synthesize the metal oxide on the surface of the nanoparticles.

8. The method of claim 7, wherein the surfactant is a non-ionic surfactant that has an ether group as a hydrophilic group and an alkyl group as a hydrophobic group.

9. The method of claim 8, wherein the surfactant is polyoxyethylene(5)nonylphenyl ether.

10. The method of claim 7, wherein the organic solvent is cyclohexane.

11. The method of claim 7, wherein the precursor material is tetraethylorthosilicate.

12. The method of claim 7, wherein the alkali catalyst is a solution of aqueous ammonia.

13. The method of claim 1, wherein the sol-gel reaction is conducted in a precursor solution in which the coated nanoparticles, a precursor material, and an alkali catalyst mediating a covalent bond between the coated nanoparticles and the precursor material are mixed in predetermined ratios in a polar aqueous solvent.

14. The method of claim 13, wherein the precursor material of the sol-gel reaction is tetramethoxysilane.

15. The method of claim 13, wherein the alkali catalyst of the sol-gel reaction is a solution of aqueous ammonia.

16. The method of claim 13, wherein the polar aqueous solvent of the sol-gel reaction is ethanol.

17. The method of claim 1, wherein the drying comprises exposing the precursor solution to an inert gas atmosphere or heating the precursor solution at a constant temperature.

* * * * *